US012793105B2

(12) United States Patent
Alwafai et al.

(10) Patent No.: US 12,793,105 B2
(45) **Date of Patent: *Nov. 10, 2026**

(54) SYSTEMS AND METHODS FOR OFFLINE AND ONLINE VEHICLE USAGE FOR VOLUME-BASED METRICS

(71) Applicant: Lyft, Inc., San Francisco, CA (US)

(72) Inventors: Deanna Ettidale Alwafai, San Francisco, CA (US); Aastha Bhargava, San Francisco, CA (US); Erin Catherine Maryak Gray, San Francisco, CA (US); Yeshwanth Kumaraswamy, San Francisco, CA (US); Adrian Paul McLean, San Francisco, CA (US); Londa Fiorella Overbeck, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/268,570

(22) Filed: Jul. 14, 2025

(65) Prior Publication Data

US 2025/0342506 A1 Nov. 6, 2025

Related U.S. Application Data

(63) Continuation of application No. 18/774,448, filed on Jul. 16, 2024, now Pat. No. 12,361,459, which is a (Continued)

(51) Int. Cl.

*G06Q 30/02* (2023.01)
*G01C 21/34* (2006.01)

(Continued)

(52) U.S. Cl.

CPC ..... *G06Q 30/0284* (2013.01); *G01C 21/3438* (2013.01); *G01C 21/3453* (2013.01);

(Continued)

(58) Field of Classification Search

CPC .. G06Q 30/0284; G06Q 10/02; G06Q 10/047; G06Q 10/063; G06Q 50/30; G01C 21/3438; G01C 21/3453

(Continued)

(56) References Cited

U.S. PATENT DOCUMENTS

| | | | | |
|---|---|---|---|---|
| 10,733,672 | B1 | 8/2020 | Bernstein et al. | |
| 10,946,862 | B1 * | 3/2021 | Bischoff | G07C 5/008 |

(Continued)

FOREIGN PATENT DOCUMENTS

| | | | |
|---|---|---|---|
| CA | 3050520 | A1 | 7/2018 |
| CN | 106231110 | A | 12/2016 |

(Continued)

OTHER PUBLICATIONS

"How does Uber handle lost of signal", Posted by u/afterlyfeix Sun, Mar. 22, 2018, 11;48:07 Eastern Daylight Time, reddit.com, 1 page; (Year: 2018).*

(Continued)

*Primary Examiner* — Daniel Vetter
*Assistant Examiner* — Freda A Nelson
(74) *Attorney, Agent, or Firm* — Keller Preece PLLC

(57) ABSTRACT

The disclosed system may include a non-transitory memory and one or more hardware processors configured to execute instructions from the non-transitory memory to perform operations including determining online data and offline data from a mobile application, wherein the online data is determined based on the mobile application being online and the offline data is determined based on the mobile application being offline, determining travel distance data from a remote device associated with the vehicle, aggregating at least a portion of the online data, at least a portion of the offline data, and at least a portion of the travel distance data, generating data associated with the aggregation of the por- (Continued)

tion of the online data, the portion of the offline data, and the portion of the travel distance data, and causing the mobile application to display the generated data. Other methods, systems, and computer-readable media are disclosed.

20 Claims, 10 Drawing Sheets

Related U.S. Application Data continuation of application No. 18/059,096, filed on Nov. 28, 2022, now Pat. No. 12,073,447, which is a continuation of application No. 16/580,224, filed on Sep. 24, 2019, now Pat. No. 11,514,487.

(60) Provisional application No. 62/881,190, filed on Jul. 31, 2019.

(51) Int. Cl.

| | |
|---|---|
| ***G06Q 10/02*** | (2012.01) |
| ***G06Q 10/047*** | (2023.01) |
| ***G06Q 10/063*** | (2023.01) |
| ***G06Q 30/0283*** | (2023.01) |
| ***G06Q 50/40*** | (2024.01) |

(52) U.S. Cl.

CPC .......... *G06Q 10/02* (2013.01); *G06Q 10/047* (2013.01); *G06Q 10/063* (2013.01); *G06Q 50/40* (2024.01)

(58) Field of Classification Search

USPC .............................................. 705/5, 13, 417

See application file for complete search history.

(56) References Cited

U.S. PATENT DOCUMENTS

| | | | |
|---|---|---|---|
| 11,443,351 B1 | 9/2022 | Blaisdell et al. | |
| 2019/0007511 A1 | 1/2019 | Rodriguez et al. | |
| 2019/0130301 A1* | 5/2019 | Fu | G06N 20/00 |
| 2020/0062274 A1* | 2/2020 | Kowal | B60W 50/0098 |
| 2021/0080269 A1 | 3/2021 | Sharma et al. | |
| 2021/0090067 A1 | 3/2021 | Shah et al. | |
| 2021/0241369 A1 | 8/2021 | Gaudin et al. | |

FOREIGN PATENT DOCUMENTS

| | | | |
|---|---|---|---|
| JP | 3157923 B2 | 4/2001 | |
| WO | WO-2018136687 A1 * | 7/2018 | G06Q 10/06315 |

OTHER PUBLICATIONS

Trivedi, Nilesh, "Building movement-aware applications, part 3: real-time tracking-Movement part 3—Real-time", Mar. 22, 2018, hypertrack.com, 13 pages, (Year: 2018).*

Grab firms up commitment for a #BetterEveryday; announces 8 new app features and enhanced everyday service, Jan. 30, 2019, Grab.com, 7 pages (Year: 2019).*

"How does Uber handle loss of signal", Posted by u/afterlyfeix Sun, Mar. 22, 2018, 11;48:07 Eastern Daylight Time, reddit.com, 2 pages (Year: 2018).

Trivedi, Nilesh, "Building movement-aware applications, part 3: real-time tracking-Movement part 3—Real-time", Mar. 22, 2018, hypertrack.com, 13 pages, discloses establishing connection from server to device in real-time for the collection and transmitting movement data by using a heartbeat signal. (Year: 2018).

"Mileage Tracker by MileK) 1.30.1.6098", uploaded Oct. 5, 2018, apkmorror.com (Year: 2018).

Myfirmsapp Introduces Its Most Powerful New Mileage Tracker Yet, Posted by MyFirmsApp, Sep. 18, 2018, 9 pages (Year: 2018).

"AutoSwitch: Autopilot to Switch between Uber/Lyft", Jan. 11, 2018, 3 pages (Year: 2018).

Keshavdas M, "School Bus GPS Tracking System: The Best Guide 2020", Mar. 25, 2019, 68 pages.

Jintao Ke et al., "Optimizing Online Matching for Ride-Sourcing Services with Multi-Agent Deep Reinforcement Learning", Mar. 10, 2019; arxiv.org, 10 pages. (Year: 2019).

U.S. Appl. No. 16/580,224, Oct. 4, 2021, Office Action.

U.S. Appl. No. 16/580,224, Aug. 1, 2022, Notice of Allowance.

U.S. Appl. No. 18/059,096, Oct. 13, 2023, Notice of Allowance.

U.S. Appl. No. 18/059,096, Apr. 18, 2024, Notice of Allowance.

U.S. Appl. No. 18/774,448, Mar. 19, 2025, Notice of Allowance.

* cited by examiner

SYSTEMS AND METHODS FOR OFFLINE AND ONLINE VEHICLE USAGE FOR VOLUME-BASED METRICS

CROSS-REFERENCE TO RELATED APPLICATIONS

The present application is a continuation of U.S. application Ser. No. 18/774,448, filed on Jul. 16, 2024, which is a continuation of U.S. application Ser. No. 18/059,096, filed Nov. 28, 2022, which issued as U.S. Pat. No. 12,073,447, which is a continuation of U.S. application Ser. No. 16/580,224, filed on Sep. 24, 2019, which issued as U.S. Pat. No. 11,514,487, which claims the benefit of and priority to U.S. Application No. 62/881,190, filed Jul. 31, 2019. The aforementioned applications are hereby incorporated by reference in their entirety.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
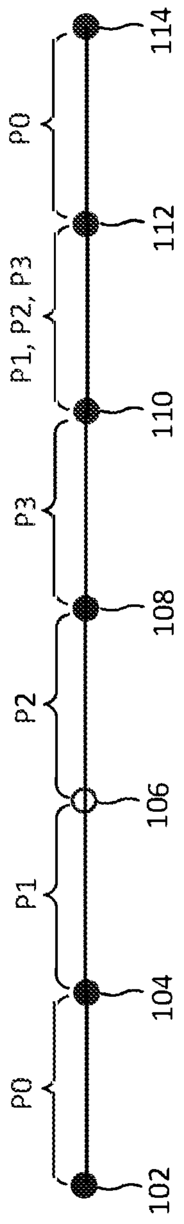
FIG. 1 is an illustration of transportation provider application online and offline states.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to methods and systems for accurately determining miles driven by transportation provider vehicles while their respective transportation provider application ("apps") are offline (e.g., when the apps lose network connectivity, the mobile phones with the apps lose battery power, and/or the apps receive instructions to go offline, among other examples). Dynamic transportation network systems may be improved with added capabilities to determine online miles while the transportation provider app is online and offline miles while the transportation provide app is offline. For example, some transportation provider vehicles may incur additional wear and tear while their respective apps are offline, such that the system may impose higher costs, in comparison to other vehicles that remain online. In particular, some vehicles may engage in higher ratios of "offline" (or P0 miles) to network-participation driving miles ("online" or P1, P2, or P3 miles). The ability to distinguish between offline and online miles may help to preserve transportation provider vehicles from extensive vehicle wear and tear.

To improve data models for transportation provider vehicles, and thereby further improve transportation provider vehicles performing dynamic transportation network services, these services may leverage insights from at least two sources of information: (1) telematics information from a telematics unit disposed within a corresponding transportation provider vehicle and (2) telemetry information from a mobile device application, such as the transportation provider app, provided by the corresponding transportation network service. The transportation network services may optionally reference a combination of these two sources of information to update the data model for transportation provider vehicles. In some cases, one of the sources of information may be used to check, correct, or supplement the other source of information, and vice versa. In additional scenarios, one of the sources of information may compensate for one or more periods of time during which the other source of information is unavailable.

As will be explained in greater detail below, determining offline and online miles using the systems methods disclosed herein may provide benefits to the operation of a transportation management system. Accordingly, as may be appreciated, the systems and methods described herein may improve the functioning of a computer that implements transportation matching. For example, these systems and methods may improve the functioning of the computer by improving transportation matching results. Additionally or alternatively, these systems and methods may improve the functioning of the computer by reducing the computing resources consumed to identify appropriate transportation matchings (and, e.g., thereby freeing computing resources for other tasks, such as those directly and/or indirectly involved in transportation matching).

Furthermore, for the reasons mentioned above, the systems and methods described herein may provide advantages to the field of transportation management and/or the field of transportation. In addition, these systems and methods may provide advantages to vehicles (whether piloted by a human, semi-autonomous, or autonomous) that operate as a part of a transportation management system. For example, the vehicles may complete transportation tasks more quickly, more efficiently (e.g., in terms of fuel consumption, vehicle wear, etc.), and/or more safely (e.g., by driving, on average, shorter distances to complete the same transportation objective).

FIG. 1 is an illustration of a transportation provider application ("app") in online and offline states. A transportation provider app may be in one of one or more mutually exclusive states. A transportation provider app may be in state P0 (offline) when the transportation provider vehicle is operating with the transportation provider app being offline. As shown in FIG. 1, the transportation provider app may transition from offline state P0 at location 102 to online state P1 at location 104. The transportation provider app may transition from offline state P0 to online state P1 by sending transportation task information from a computing device associated with the vehicle (e.g., executing an entry on a dynamic transportation network application, such as a transportation provider application, running on a transportation provider computing device). The transportation provider vehicle may travel from location 104 to location 106 while remaining in online state P1. While in online state P1, the transportation provider app may be waiting for a transportation match to a transportation requestor. At location 106, the transportation provider app may transition to state P2 when a transportation match is made and the transportation provider app is assigned a transportation task (e.g., to provide instructions, routing, and/or other support for a transportation provider to convey a transportation requestor from a designated origin to a designated destination). The transportation provider vehicle may travel from location 106 to transportation requestor pickup location 108 while remaining in state P2. While in online state P2, the transportation provider vehicle may be traveling to transportation requestor pickup location 108. At transportation requestor pickup location 108 the transportation provider vehicle may pick up a transportation requestor(s). The transportation provider vehicle may travel from transportation requestor pickup location 108 to transportation requestor drop-off location 110 while remaining in online state P3. While in online state P3, the transportation provider app may indicate a transportation task of transporting the transportation requestor(s) from transportation requestor pickup location 108 to transportation requestor drop-off location 110. After dropping off the transportation requestor at location 110, the transportation provider app may transition to any of states P1, P2, or P3. Alternatively, the transportation provider app may transition to state P0 at location 112 and go offline. At location 114, the vehicle engine may be stopped and the transportation provider app may go offline. The transportation provider app may be offline under one or more a variety of conditions including, without limitation, the transportation provider app transitioning to state P0, a user of the transportation provider app putting the transportation provider app in a state in which the transportation provide app does not accept transportation tasks, the transportation provider app losing connectivity, the smartphone hosting the transportation provider app losing network connectivity, the smartphone hosting the transportation provider app being turned off, the transportation provider app being terminated, and/or the vehicle engine being stopped.

While the transportation provider application is in online states P1, P2, or P3, the dynamic transportation network may receive travel distance data (e.g., odometer reading) from a remote device (e.g., telematics device) in the vehicle associated with the online distances traveled by the vehicle. The dynamic transportation network may assign a first value for use of the vehicle for the online distances traveled by the vehicle from location 104 to 106, 106 to 108, 108 to 110, and 110 to 112 while the transportation provider app is online and performing the transportation task (or while the transportation provider app is online and waiting for a transportation match). The dynamic transportation network may assign a second value for use of the vehicle for the offline distances traveled by the vehicle while the transportation provider application is offline in state P0 (e.g., not in one of online states P1, P2, or P3). The functionality of providing travel distance data (e.g., offline data) may be turned off based on transportation provider and/or transportation requestor preferences. In some examples, the transportation provider application may request permissions to collect and/or provide travel distance data. Travel distance data (e.g., offline data) may be erased rather than stored indefinitely. For example, the travel distance data may be erased after use and/or may be erased periodically (e.g., hourly or daily). In some examples, the transportation provider may choose to opt-out of providing offline data (or, in some examples, may opt-in to providing offline data) while the transportation provider app is offline (e.g., in offline state P0).

Figure 2:
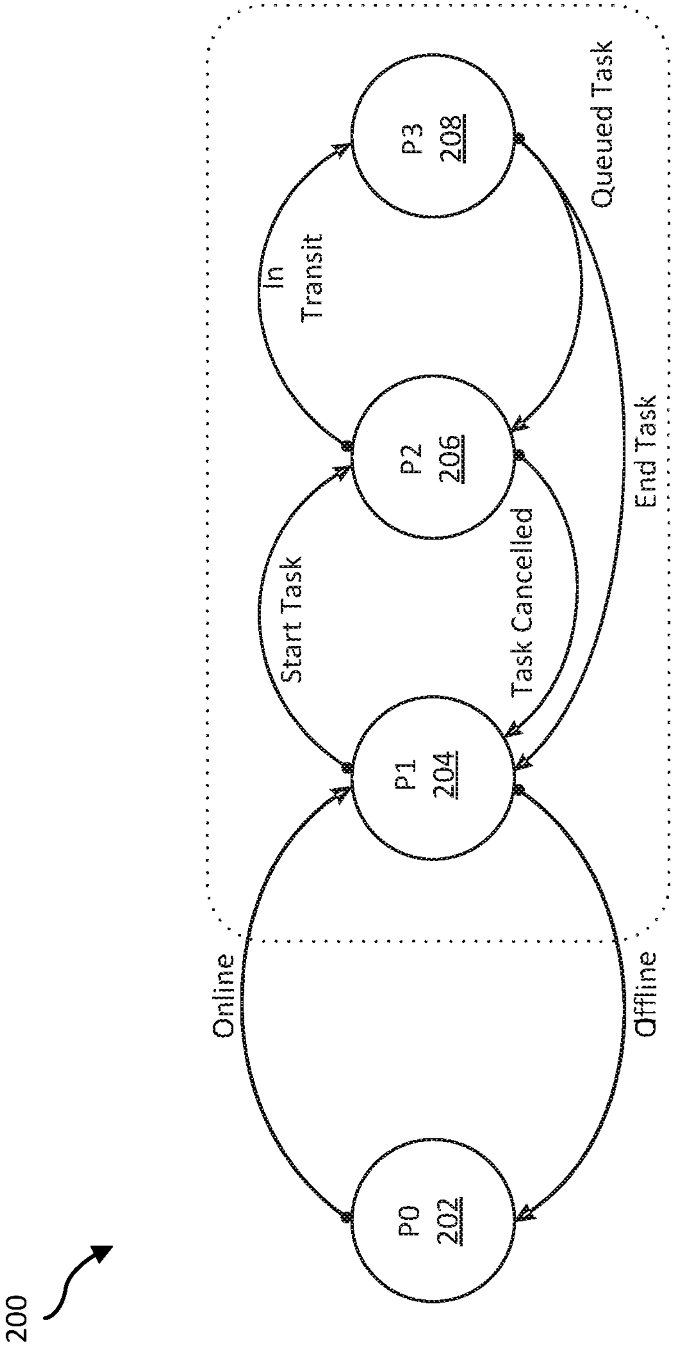
FIG. 2 is an example state diagram indicating transportation provider application states.

FIG. 2 is an illustration of a state diagram indicating transportation provider app states. State diagram 200 of FIG. 2 shows the online and offline states of the transportation provider app as the app transitions between states when performing a transportation task and when not performing a transportation task. In some examples, a transportation provider app may be in state P0 (e.g., offline) in which the transportation provider vehicle may be used. While the transportation provider application is offline, the vehicle may be assigned a second value. The second value may be determined using any suitable method. For example, the second value may be determined as a flat rate, a rate per unit distance (e.g., per mile), a rate per unit time (e.g. per week), a flat rate under a threshold number of miles, a rate per unit distance over a threshold number of miles, or a combination thereof. In some examples, the second value may be a flat rate for a travel distance under a threshold number of miles for a time period (e.g., a week) and a third value for use of the vehicle may be assigned in response to the travel distance over the time period exceeding the threshold.

In some examples, the transportation provider app may transition from offline state P0 202 to online state P1 204. The transportation provider app may generate online data when transitioning from offline state P0 202 to online state P1 204 by sending transportation task information from a computing device (e.g., a smartphone) within the vehicle running the transportation provider application. While in online state P1 204, the transportation provider app may be waiting for a transportation match to provide transportation services to a transportation requestor. In state P1 204, the transportation provider app may be matched to a transportation requestor and start a transportation task, thereby transitioning to state P2 206. In some examples, a transportation provider app may transition from offline state P0 202 to online state P1 204, and the transportation provider may continue to operate the vehicle. In the case in which the transportation provider app transitions from offline state P0 202 to online state P1 204 and the transportation provider continues to operate the vehicle, the dynamic transportation network may transition the transportation provider app back to offline state P0 202. While in online state P1 204, a transportation provider app may be required to accept a threshold number of transportation matches and/or perform a threshold number of transportation tasks in order to remain in the online state P1 204.

The threshold number of transportation matches required to remain in online state P1 204 may be a set threshold (e.g., a default threshold) and/or may vary based on factors including, without limitation, a time of day, a day of a week, a geographic area, a level of demand for transportation services in a geographic area, or a combination thereof. While in online state P1 204, a transportation provider app may provide instructions to operate the vehicle within a defined geographic area (e.g., a geofenced area) in order to remain in the online state P1 204. In some examples, a transportation provider app may enter a destination mode in which the transportation provider app is matched with transportation tasks that include a travel route along a transportation provider's destination route. A transportation provider may be allowed to remain in the destination mode for a threshold number of transportation tasks while in online state P1 204 in order to remain in online state P1 204. Additionally or alternatively, a transportation provider may be allowed to remain in destination mode for a threshold period of time while in online state P1 204.

In state P2 206, the transportation provider vehicle may travel to a transportation requestor pickup location. In some examples, the transportation provider app may be in state P2 206 and the requested transportation task may be canceled, thereby transitioning the transportation provider app to state P1 204 to wait for another transportation match. When the transportation requestor is picked up, the transportation provider app may transition to state P3 208 and the transportation provider vehicle may travel from the transportation requestor pickup location to the transportation requestor drop-off location. While in online state P3, the transportation provider vehicle may be performing a transportation task of transporting the transportation requestor(s) from the transportation requestor pickup location to the transportation requestor drop-off location. In some examples, the transportation provider app may be in state P3 208 during the trip, and when the transportation requestor is dropped off, the transportation provider app may then return to state P2 206 to perform a different transportation task. In some examples, the transportation provider app may be in state P3 208 when the transportation requestor is dropped off and the transportation provider app may transition to state P1 204 to wait for another transportation match. The transportation provider app may generate offline data by transitioning from online state P1 204 to offline state P0 202 after completing a transportation task shift by sending transportation task information from a computing device (e.g., a smartphone) within the vehicle running a transportation provider application.

While the transportation provider app is in states P0, P1, P2, or P3, the dynamic transportation network may determine travel distance data (e.g., an odometer reading) from a remote device (e.g., telematics device) in the vehicle for the distances traveled by the vehicle in each of states P0, P1, P2, and P3. The dynamic transportation network may aggregate the online data, the offline data, and the travel distance data to generate data, including a distance traveled by the vehicle while the transportation provider app is online (i.e., an online travel distance) and/or a distance traveled by the vehicle while the transportation provider app is offline (i.e., an offline travel distance).

The transportation provider application running on the computing device (e.g., smartphone) may display the generated data. For example, the transportation provider application may display the offline travel distance during a time period and/or the online travel distance during a time period as described below with respect to FIG. 6. Additionally or alternatively, the transportation provider application may display highway travel distance and/or non-highway travel distance.

The dynamic transportation network may assign a first value for use of the vehicle for the distances traveled by the vehicle while the transportation provider app is online in states P1, P2, or P3 and may assign a second value for use of the vehicle for the distances traveled by the vehicle while the transportation provider app is offline in state P0.

Figure 3:
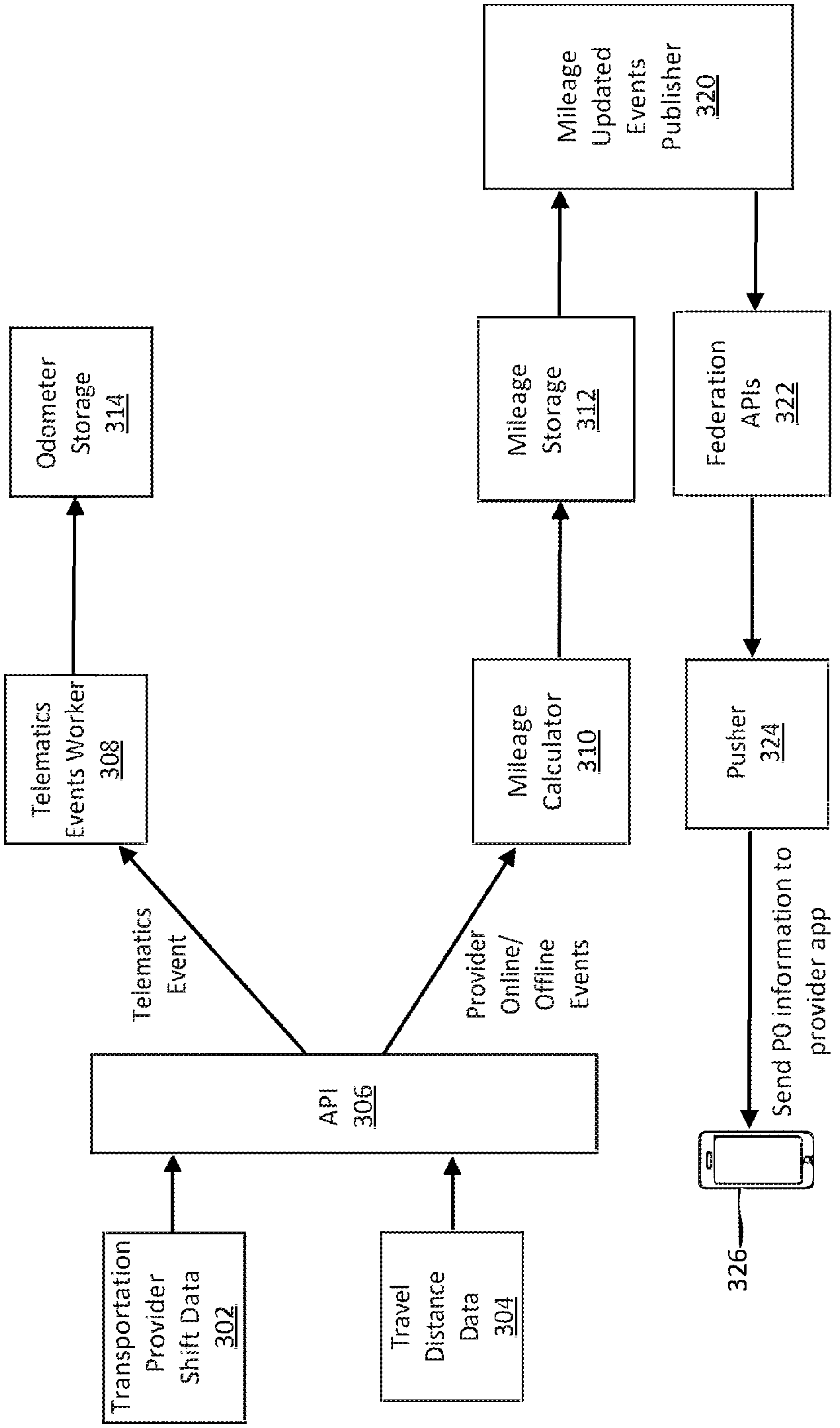
FIG. 3 is an example block diagram for determining a distance traveled by a vehicle while the transportation provider application is offline.

FIG. 3 is an example block diagram of a process for determining a distance traveled by a vehicle while the transportation provider app is offline. A dynamic transportation network may determine a distance traveled by a vehicle while the transportation provider app is in offline state P0 using any suitable method. As shown in FIG. 3, API (Application Programming Interface) 306 may receive transportation provider shift data 302 (including, e.g., online data and offline data) and travel distance data 304 (e.g., mileage data). Transportation provider shift data 302 may include data associated with a transportation provider's shift for performing transportation tasks in the dynamic transportation network. For example, transportation provider shift data 302 may indicate that the transportation provider app is offline. Transportation provider shift data 302 may include online data. For example, transportation provider shift data 302 may indicate the transportation provider app is in online state P1. While in online state P1, the transportation provider app may be waiting for a transportation match to provide transportation services to a transportation requestor.

Transportation provider shift data 302 may indicate whether the transportation provider app is online or offline. Transportation provider shift data 302 may include online data and offline data. Transportation provider shift data 302 may indicate the transportation provider app is in online state P2. While in online state P2, the transportation provider app may be matched to a transportation requestor and start a transportation task. In online state P2, the transportation provider vehicle may travel to a transportation requestor pickup location. Transportation provider shift data 302 may indicate that the transportation provider app is in online state P3. When the transportation requestor is picked up, the transportation provider app may transition from online state P2 to online state P3 and the transportation provider vehicle may travel from the transportation requestor pickup location to the transportation requestor drop-off location. After completing the transportation task, transportation provider shift data 302 may indicate the transportation provider app has transitioned to online state P1 (e.g., waiting for another transportation match) or offline state P0. Transportation provider shift data 302 may be received from a computing device (e.g., smartphone) within the vehicle running a transportation provider application associated with the dynamic matching system.

API 306 may provide transportation provider shift data 302 to mileage calculator 310. Mileage calculator 310 may determine the number of online miles and the number of offline miles driven by the transportation provider vehicle based on transportation provider shift data 302 and travel distance data 304. Mileage calculator 310 may receive travel distance data (e.g., odometer readings) from travel distance data 304. Mileage calculator 310 may also determine the number of online miles driven by the transportation provider vehicle by aggregating the number of online miles accumulated while the mobile application is in online states P1, P2, or P3. Mileage calculator 310 may determine the number of offline miles driven by the transportation provider vehicle by determining the number of offline miles accumulated while the mobile application is in offline state P0. Mileage calculator 310 may aggregate the travel distance data 304 and the transportation provider shift data 302, determine an online distance traveled and an offline distance traveled based on the correlation of the travel distance data 304 and the transportation provider shift data 302. The online distance traveled may be determined based on the mobile application being online and the offline distance traveled may be determined based on the mobile application being offline. Mileage calculator 310 may generate data associated with at least one of the online distance traveled and the offline distance traveled and store the generated data in mileage storage 312. Mileage storage 312 may provide the generated data to mileage updated events publisher 320. Mileage updated events publisher 320 may determine which portions of the generated data to be published and provide the generated data to be published to federation APIs 322. Federation APIs 322 may provide the generated data to pusher 324. Pusher 324 may send the generated data (e.g., number of offline miles driven during a time period, number of online miles driven during a time period) to provider device 326. In some examples, provider device 326 may display the generated data in a transportation provider application (e.g., mobile application). As described below with respect to FIG. 6, the generated data may be displayed by the transportation provider application running on transportation provider device 326.

In some examples, telematics events worker 308 may periodically poll a telematics service to download travel distance (e.g., mileage) data. Telematics events worker 308 may download mileage data for all vehicles in the dynamic transportation network and produce suitable analytics events on a periodic basis (e.g., every 30 seconds). The mileage data may include vehicle odometer readings and may be stored in odometer storage 314.

Figure 4:
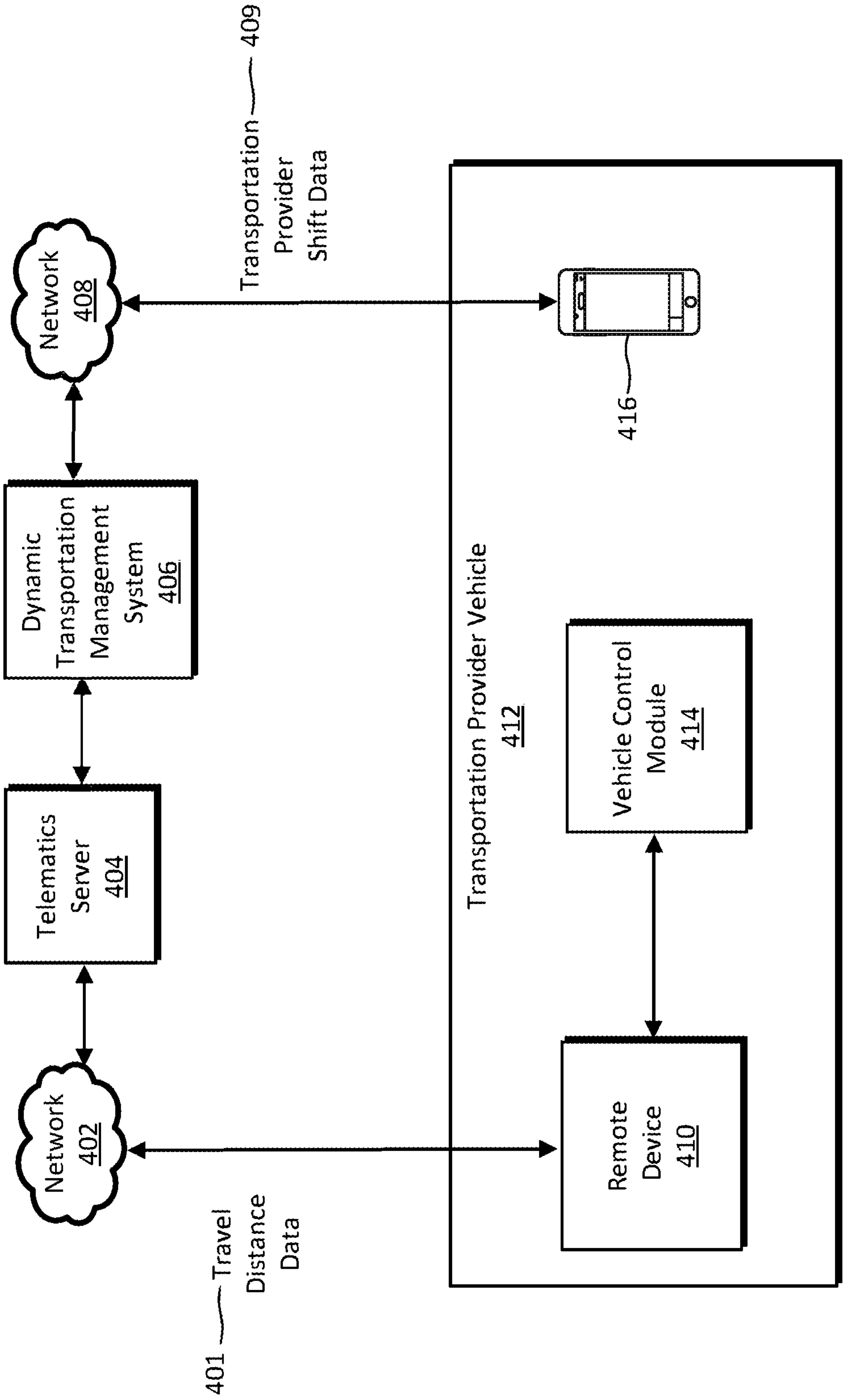
FIG. 4 is a block diagram of a dynamic transportation management system receiving travel distance data and transportation provider shift data.

FIG. 4 is a block diagram of a dynamic transportation management system receiving travel distance data and transportation provider shift data. Dynamic transportation management system 406 may receive travel distance data and transportation task information (e.g., online data and/or offline data) using any suitable method. As shown in FIG. 4, dynamic transportation management system 406 may receive travel distance data 401 from telematics server 404. Telematics server 404 may be part of a vehicle fleet management platform that provides real time data associated with transportation provider vehicle 412. Dynamic transportation management system 406 may receive travel distance data 401 from telematics server 404 on a periodic basis (e.g., once every 30 seconds) and may automatically expire travel distance data items older than a certain threshold (e.g., items older than one week). Telematics server 404 may receive travel distance data 401 from remote device 410 (e.g., telematics device) over network 402 (e.g., a mobile network such as a mobile telephone network, cellular network, satellite network, or other mobile network).

In some examples, remote device 410 may be any device capable of determining and sending travel distance data 401 to telematics server 404. Remote device 410 may determine travel distance data 401 using any suitable method. For example, remote device 410 may be an electronic device that plugs into the OBDII (On-Board Diagnostic System) port of vehicle 412 and provides telematics data remotely. Remote device 410 may include a GPS receiver or other location-based service such as cellular triangulation or WiFi positioning that determines and records date, time, and vehicle 412 location on a periodic basis. Remote device 410 may send the date, time, and vehicle 412 location to telematics server 404. Remote device 410 may receive travel distance data 401 from vehicle control module 414. Vehicle control module 414 may be an electronic module within vehicle 412 that determines and stores various parameters associated with the vehicle including, without limitation, travel distance data (e.g., odometer reading), vehicle speed, roadway speed limit, linear acceleration/deceleration rate, angular acceleration/deceleration rate, engine speed, throttle position, and braking pressure.

In some examples, dynamic transportation management system 406 may receive transportation provider shift data 409 from transportation provider computing device 416 over network 408. Transportation provider shift data 409 may be entered into a transportation provider application running on computing device 416 by the transportation provider (e.g., executing an entry on the transportation provider application running on computing device 416). Transportation provider shift data 409 may include, without limitation, online data, offline data, transitioning from offline to online, transitioning from online to offline, accepting a transportation task, pickup of a transportation requestor, and drop off of a transportation requestor.

Additionally or alternatively, dynamic transportation management system 406 may receive travel distance data 401 from transportation provider computing device 416. Computing device 416 may determine travel distance data 401 using GPS data, map data, or other travel distance measuring methods. Computing device 416 may send travel distance data 401 to dynamic transportation management system 406 when remote device 410 is unable to send travel distance data 401 (e.g., when network 402 is unavailable). Additionally or alternatively, transportation management system 406 may receive travel distance data 401 from both remote device 410 and computing device 416.

A dynamic transportation management system may determine a distance traveled by a vehicle while the transportation provider app is in offline state P0 using any suitable method. In some examples, a dynamic transportation management system may accrue errors in determining offline distance traveled caused by delays in updating telematics events (e.g., delays in receiving data from remote device 410 and/or computing device 416). In some examples, an odometer reading may be received from vehicle control module 414 in vehicle 412 by remote device 410. Remote device 410 may upload the odometer reading to telematics server 404 over network 402. At certain times, remote device 410 may be unable to send the odometer readings to telematics server 404 due to lack of communications over network 402 (e.g., vehicle out of cell coverage range) and/or computing device 416 may be unable to send travel distance data. The lack of odometer readings may cause accumulated errors in the travel distance determination. In some examples, when storing odometer readings for the start and end of all transportation provider shifts, an error for each shift may accrue over time, thereby resulting in an unacceptable error magnitude. To determine an accurate offline distance traveled (e.g., number of offline miles) and overcome accruing an unacceptable error magnitude, the number of total miles driven may be determined for a time period (e.g., one week) and the number of online miles (e.g., P1+P2+P3) may be subtracted from the total miles to determine offline distance traveled.

Figure 5:
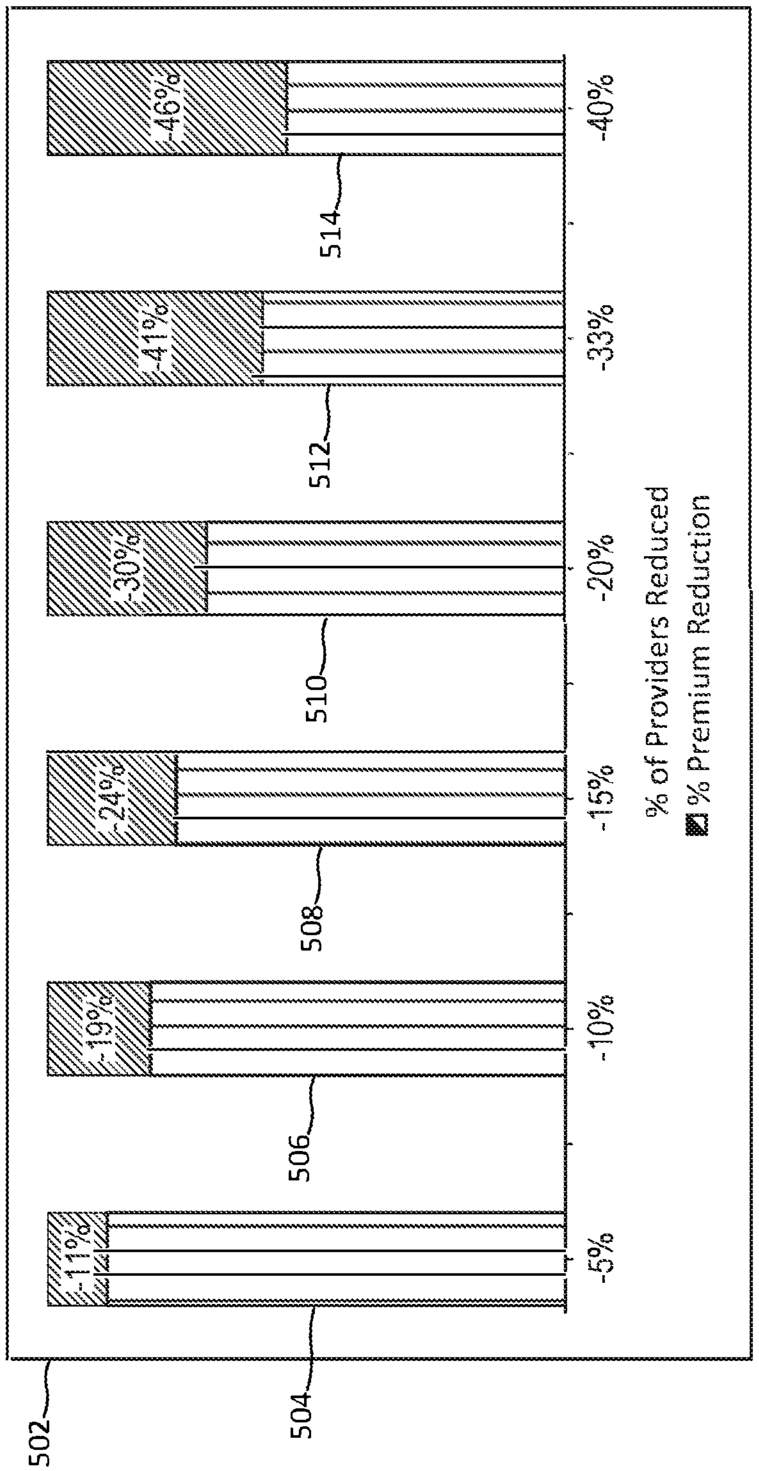
FIG. 5 is a chart showing reductions in insurance costs as a function of transportation provider vehicle reduction.

FIG. 5 is a chart showing percent reduction in insurance costs as a function of transportation provider vehicle reduction. In some examples, transportation providers may operate vehicles primarily in an offline state P0 and secondarily in any one of online states P1, P2, or P3. The vehicles driven primarily in offline state may have a higher contribution to vehicle insurance premiums than vehicles driven primarily in online state. As shown in chart 502 of FIG. 5, reducing the number of vehicles driven primarily in offline state may contribute to reducing vehicle insurance premiums. For example, bar chart 504 shows that a 5% reduction in the number of vehicles driven primarily in offline state may reduce vehicle insurance premiums by 11%. Bar chart 506 shows that a 10% reduction in the number of vehicles driven primarily in offline state may reduce vehicle insurance premiums by 19%. Bar chart 508 shows that a 15% reduction in the number of vehicles driven primarily in offline state may reduce vehicle insurance premiums by 24%. Bar chart 510 shows that a 20% reduction in the number of vehicles driven primarily in offline state may reduce vehicle insurance premiums by 30%. Bar chart 512 shows that a 33% reduction in the number of vehicles driven primarily in offline state may reduce vehicle insurance premiums by 41%. Bar chart 514 shows that a 40% reduction in the number of vehicles driven primarily in offline state may reduce vehicle insurance premiums by 46%. Chart 502 shows that a vehicle insurance premium value may be based on whether a vehicle is primarily driven online or offline. For example, a first insurance value may be assigned to the vehicle for the distance traveled by the vehicle while the transportation provider app is online (e.g., P0, P1, or P2) and a second insurance value may be assigned to the vehicle for the distance traveled by the vehicle while the transportation provider app is offline (e.g., P0).

Figure 6:
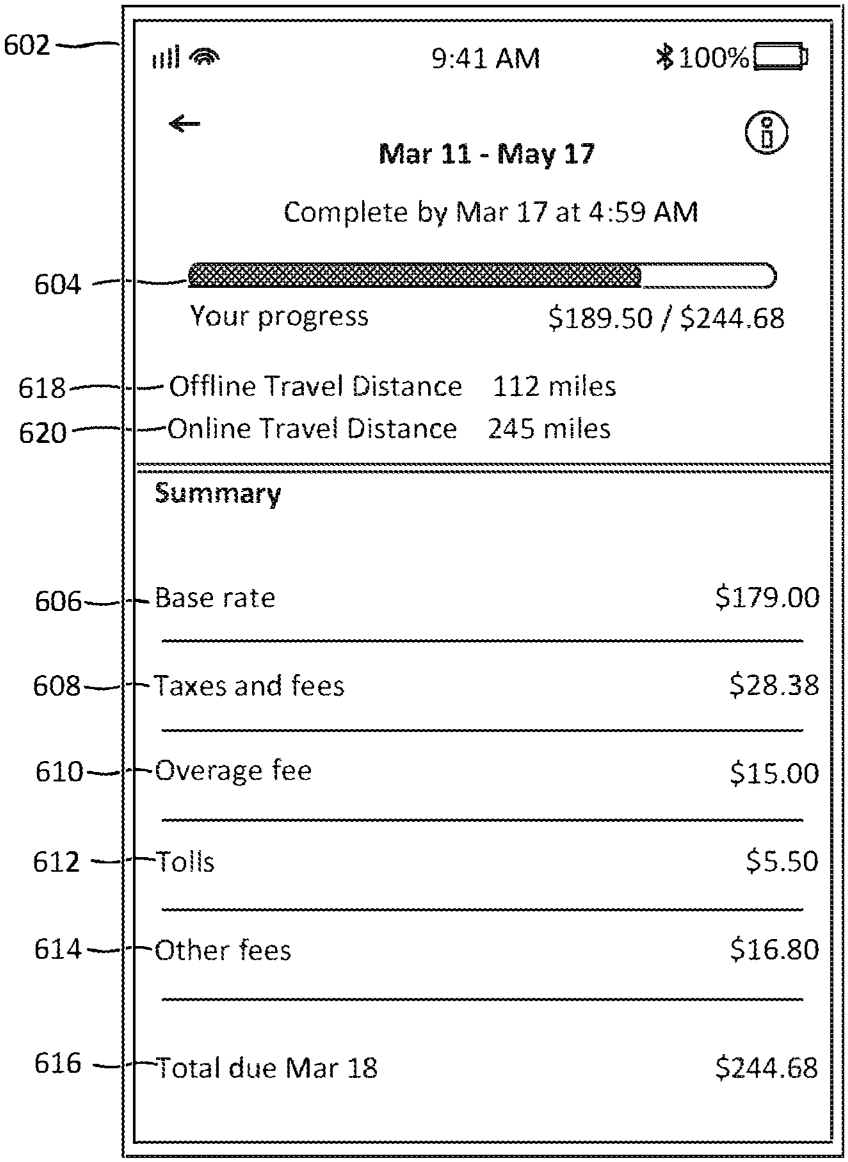
FIG. 6 is an illustration of an example method for displaying generated data on a transportation provider device.

FIG. 6 is an illustration of an example interface for displaying generated data on a transportation provider device. A dynamic matching system may include a transportation provider device (e.g., a smartphone) to provide generated data (e.g., an assigned value for use of a vehicle, an online travel distance, an offline travel distance) to a transportation provider. Referring to FIG. 6, transportation provider device 602 may display bar chart 604 showing a value earned by the transportation provider for performing transportation tasks during a time period and a value for use of the vehicle during the time period. Transportation provider device 602 may display base rate 606. Base rate 606 may be a base (e.g., minimum) value assigned to the vehicle for use by the transportation provider. Taxes and fees 608 may display any taxes and/or fees associated with the value assigned for use of the vehicle. Overage fee 610 may display any overage fees associated with the value assigned for use of the vehicle. For example, overage fee 610 may display fees associated with use of the vehicle while the transportation provider app is offline. A transportation provider may be assigned a threshold number of miles for operating the vehicle while the transportation provider app is offline during a time period. If the transportation provider operates the vehicle while the transportation provider app is offline for a distance exceeding the threshold number of miles, an overage fee may be applied. Tolls 612 may display an aggregation of tolls charged for use of travel routes (e.g., highways, tunnels bridges) while operating the vehicle during the time period. Tolls 612 may display an aggregate of tolls charged for use of travel routes while operating the vehicle online, offline or both online and offline. Transportation provider device 602 may also display other fees 614 associated with use of the vehicle (e.g., add-on services and costs incurred during use of the vehicle and/or requested by the transportation provider) and a total cost 616 associated with use of the vehicle. In some examples, transportation provider device 602 may display offline travel distance 618 and/or online travel distance 620.

Figure 7:
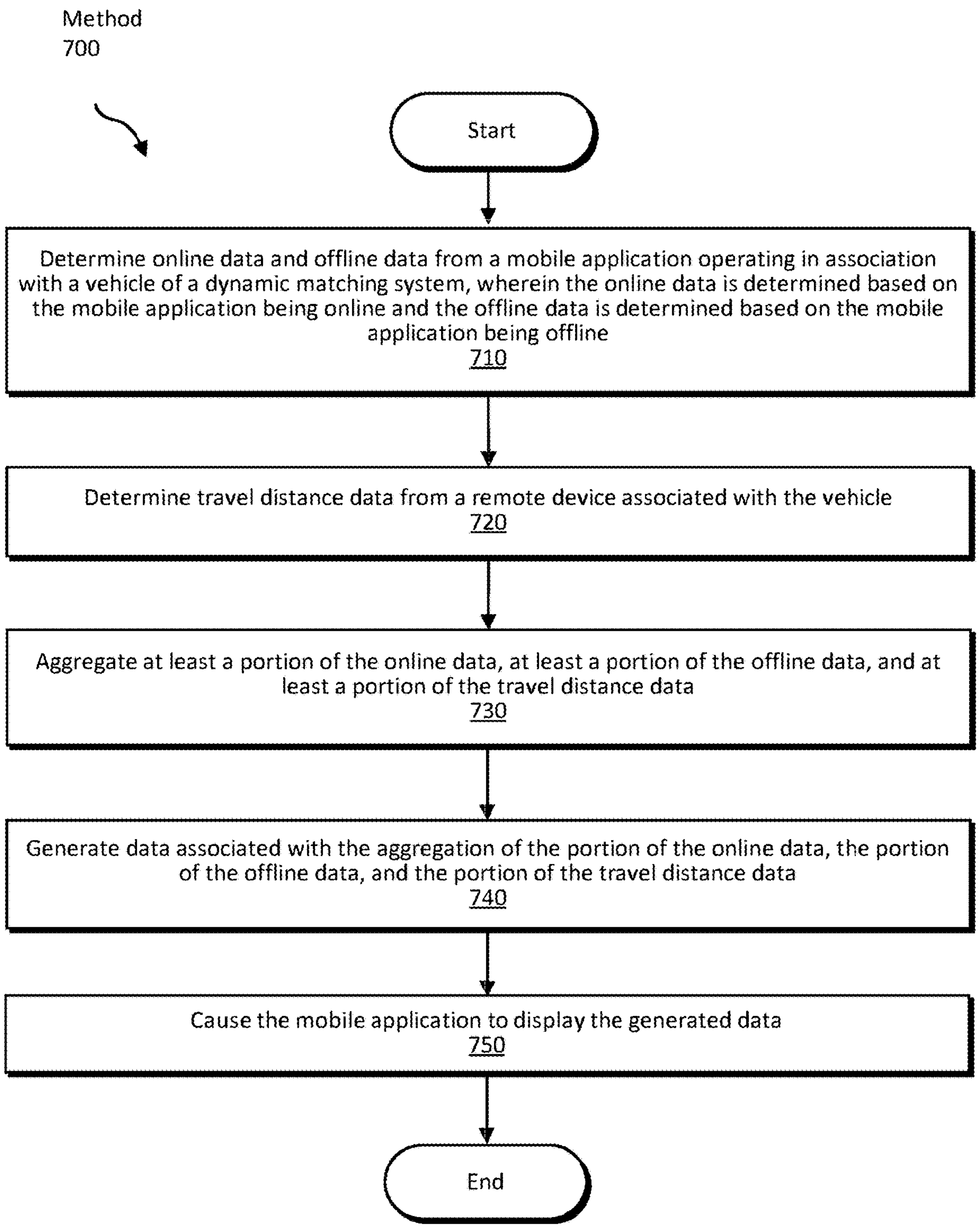
FIG. 7 is a flow diagram of an example method for determining online and offline vehicle usage.

FIG. 7 is a flow diagram of an example method for determining and displaying online travel distance and offline travel distance driven by a transportation provider vehicle. As shown in FIG. 7, method 700 may include, at step 710, determining online data and offline data from a mobile application operating in association with a vehicle of a dynamic matching system. The online data may be determined based on the mobile application being online and the offline data may be determined based on the mobile application being offline. At step 720, the method may include determining travel distance data from a remote device associated with the vehicle. At step 730, the method may include aggregating at least a portion of the online data, at least a portion of the offline data, and at least a portion of the travel distance data. At step 740, the method may include generating data associated with the aggregation of the portion of the online data, the portion of the offline data, and the portion of the travel distance data. At step 750, the method may include causing the transportation provider application to display the generated data.

In one example, a computer-implemented method may include determining online data and offline data from a mobile application operating in association with a vehicle of a dynamic matching system. The online data may be determined based on the mobile application being online and the offline data may be determined based on the mobile application being offline. The method may include determining travel distance data from a remote device associated with the vehicle. The method may include aggregating at least a portion of the online data, at least a portion of the offline data, and at least a portion of the travel distance data. The method may include generating data associated with the aggregation of the portion of the online data, the portion of the offline data, and the portion of the travel distance data. The method may include causing the transportation provider application to display the generated data.

In some examples, the data associated with the aggregation of the portion of the online data, the portion of the offline data, and the portion of the travel distance data may include an online travel distance associated with the vehicle and an offline travel distance associated with the vehicle.

In some examples, at least one of the online travel distance and the offline travel distance may include an odometer reading received periodically from the remote device associated with the vehicle.

In some examples, at least one of the online travel distance and the offline travel distance may include distance data received from a computing device that hosts the mobile application within the vehicle.

In some examples, the method may further include assigning a first value for use of the vehicle based on the online travel distance and assigning a second value for use of the vehicle based on the offline travel distance.

In some examples, the method may further include displaying at least one of the first value for use of the vehicle and the second value for use of the vehicle on the computing device that hosts the mobile application within the vehicle.

In some examples, the method may further include determining the offline travel distance over a time period, assigning a third value for use of the vehicle in response to the offline travel distance over the time period exceeding a threshold, and displaying the third value on the computing device that hosts the mobile application within the vehicle.

In some examples, the online travel distance may include at least one of a distance traveled by the vehicle while the mobile application is waiting to receive a transportation match, a distance traveled by the vehicle to a transportation requestor pickup location, and a distance traveled by the vehicle to a transportation requestor drop-off location.

In some examples, if the odometer reading from the remote device associated with the vehicle is not received for a portion of a time period, a distance error may be accumulated over the time period, and the distance error may be associated with at least one of the online travel distance and the offline travel distance.

In some examples, the method may further include correcting the distance error associated with the at least one of the online travel distance and the offline travel distance.

In one example, a system may include a non-transitory memory and one or more hardware processors configured to execute instructions from the non-transitory memory to perform operations including determining online data and offline data from a mobile application operating in association with a vehicle of a dynamic matching system. The online data may be determined based on the mobile application being online and the offline data may be determined based on the mobile application being offline, determining travel distance data from a remote device associated with the vehicle, aggregating at least a portion of the online data, at least a portion of the offline data, and at least a portion of the travel distance data, generating data associated with the aggregation of the portion of the online data, the portion of the offline data, and the portion of the travel distance data, and causing the mobile application to display the generated data.

In some examples, the data associated with the aggregation of the portion of the online data, the portion of the offline data, and the portion of the travel distance data may include an online travel distance associated with the vehicle and an offline travel distance associated with the vehicle.

In some examples, at least one of the online travel distance and the offline travel distance may include an odometer reading received periodically from the remote device associated with the vehicle.

In some examples, at least one of the online travel distance and the offline travel distance includes distance data received from a computing device that hosts the mobile application within the vehicle.

In some examples, the operations may further include assigning a first value for use of the vehicle based on the online travel distance and assigning a second value for use of the vehicle based on the offline travel distance.

In some examples, the operations may further include displaying at least one of the first value for use of the vehicle and the second value for use of the vehicle on the computing device that hosts the mobile application within the vehicle.

In some examples, the operations may further include determining the offline travel distance over a time period, assigning a third value for use of the vehicle in response to the offline travel distance over the time period exceeding a threshold, and displaying the third value on the computing device that hosts the mobile application within the vehicle.

In some examples, the online travel distance may include at least one of a distance traveled by the vehicle while the mobile application is waiting to receive a transportation match, a distance traveled by the vehicle to a transportation requestor pickup location, and a distance traveled by the vehicle to a transportation requestor drop-off location.

In some examples, if the odometer reading from the remote device associated with the vehicle is not received for a portion of a time period, a distance error may be accumulated over the time period, and the distance error may be associated with at least one of the online travel distance and the offline travel distance.

In some examples, the operations may further include correcting the distance error associated with the at least one of the online travel distance and the offline travel distance.

In one example, a non-transitory computer-readable storage medium may include computer-readable instructions that, when executed by at least one processor of a computing device, cause the computing device to determine online data and offline data from a mobile application operating in association with a vehicle of a dynamic matching system. The online data may be determined based on the mobile application being online and the offline data may be determined based on the mobile application being offline, determine travel distance data from a remote device associated with the vehicle, aggregate at least a portion of the online data, at least a portion of the offline data, and at least a portion of the travel distance data, generate data associated with the aggregation of the portion of the online data, the portion of the offline data, and the portion of the travel distance data, and cause the mobile application to display the generated data.

Figure 8:
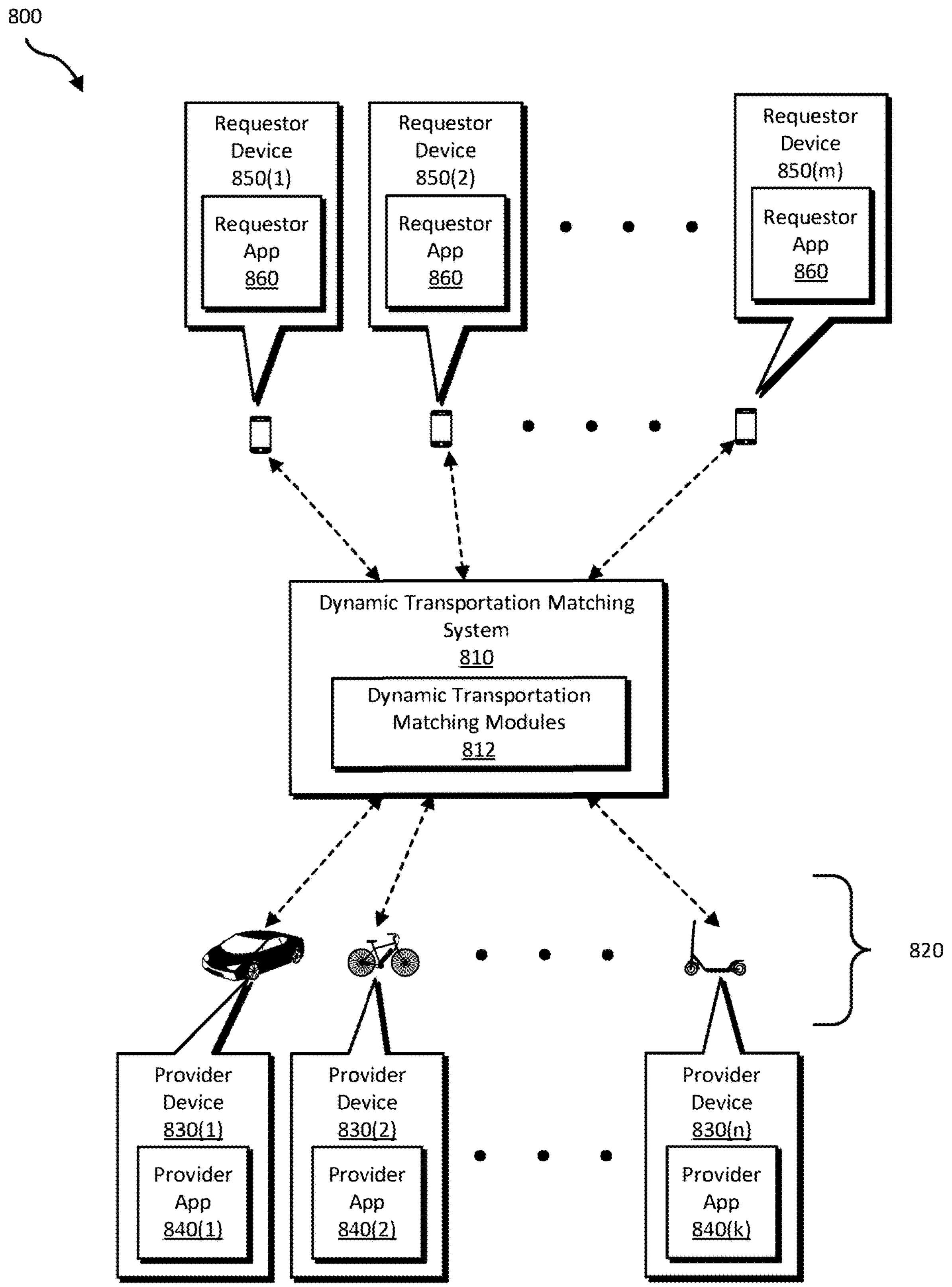
FIG. 8 illustrates an example system for matching transportation requests with a dynamic transportation network that includes personal mobility vehicles.

FIG. 8 illustrates an example system 800 for matching transportation requests with a dynamic transportation network that includes personal mobility vehicles. As shown in FIG. 8, a dynamic transportation matching system 810 may be configured with one or more dynamic transportation matching modules 812 that may perform one or more of the steps described herein. Dynamic transportation matching system 810 may represent any computing system and/or set of computing systems capable of matching transportation requests. Dynamic transportation matching system 810 may be in communication with computing devices in each of a group of vehicles 820. Vehicles 820 may represent any vehicles that may fulfill transportation requests. In some examples, vehicles 820 may include disparate vehicle types and/or models. For example, vehicles 820 may include road-going vehicles and personal mobility vehicles. In some examples, some of vehicles 820 may be standard commercially available vehicles. According to some examples, some of vehicles 820 may be owned by separate individuals (e.g., transportation providers). Furthermore, while, in some examples, many or all of vehicles 820 may be human-operated, in some examples many of vehicles 820 may also be autonomous (or partly autonomous). Accordingly, throughout the instant disclosure, references to a "transportation provider" (or "provider") may, where appropriate, refer to an operator of a human driven vehicle, an autonomous vehicle control system, an autonomous vehicle, an owner of an autonomous vehicle, an operator of an autonomous vehicle, an attendant of an autonomous vehicle, a vehicle piloted by a requestor, and/or an autonomous system for piloting a vehicle. While FIG. 8 does not specify the number of vehicles 820, it may be readily appreciated that the systems described herein are applicable to hundreds of vehicles, thousands of vehicles, or more. In one example, dynamic transportation matching system 810 may coordinate transportation matchings within a single region for 50,000 vehicles or more on a given day. In some examples, vehicles 820 may collectively form a dynamic transportation network that may provide transportation supply on an on-demand basis to transportation requestors.

As mentioned above, dynamic transportation matching system 810 may communicate with computing devices in each of vehicles 820. The computing devices may be any suitable type of computing device. In some examples, one or more of the computing devices may be integrated into the respective vehicles 820. In some examples, one or more of the computing devices may be mobile devices. For example, one or more of the computing devices may be smartphones. Additionally or alternatively, one or more of the computing devices may be tablet computers, personal digital assistants, or any other type or form of mobile computing device. According to some examples, one or more of the computing devices may include wearable computing devices (e.g., a driver-wearable computing device), such as smart glasses, smart watches, etc. In some examples, one or more of the computing devices may be devices suitable for temporarily mounting in a vehicle (e.g., for use by a requestor and/or provider for a transportation matching application, a navigation application, and/or any other application suited for the use of requestors and/or providers). Additionally or alternatively, one or more of the computing devices may be devices suitable for installing in a vehicle and/or may be a vehicle's computer that has a transportation management system application installed on the computer in order to provide transportation services to transportation requestors and/or communicate with dynamic transportation matching system 810.

As shown in FIG. 8, vehicles 820 may include provider devices 830(1)-(*n*) (e.g., whether integrated into the vehicle, permanently affixed to the vehicle, temporarily affixed to the vehicle, worn by a driver of the vehicle, etc.). In some examples, provider devices 830 may include a provider apps 840(1)-(*k*). Provider apps 840(1)-(*k*) may represent any application, program, and/or module that may provide one or more services related to operating a vehicle and/or providing transportation matching services. For example, provider apps 840(1)-(*k*) may include a transportation matching application for providers and/or one or more applications for matching personal mobility vehicles (PMVs) with requestor devices. In some embodiments, different types of provider vehicles may be provisioned with different types of provider devices and/or different provider applications. For example, PMVs may be provisioned with provider devices that are configured with a provider application that enables transportation requestors to reserve and/or operate the PMV while road-constrained vehicles (e.g., cars) may be provisioned with provider devices that are configured with a provider application that enables provider vehicle operators (e.g., transportation providers) to respond to requests from transportation requestors. In some examples, provider applications 840(1)-(*k*) may match the user of provider apps 840(1)-(*k*) (e.g., a transportation provider) with transportation requestors through communication with dynamic transportation matching system 810. In addition, and as is described in greater detail below, provider apps 840(1)-(*k*) may provide dynamic transportation management system 810 with information about a provider (including, e.g., the current location of the provider and/or vehicle) to enable dynamic transportation management system 810 to provide dynamic transportation matching and/or management services for the provider and one or more requestors. In some examples, provider apps 840(1)-(*k*) may coordinate communications and/or a payment between a requestor and a provider. According to some embodiments, provider apps 840(1)-(*k*) may provide a map service, a navigation service, a traffic notification service, and/or a geolocation service.

Additionally, as shown in FIG. 8, dynamic transportation matching system 810 may communicate with requestor devices 850(1)-(*m*). In some examples, requestor devices 850 may include a requestor app 860. Requestor app 860 may represent any application, program, and/or module that may provide one or more services related to requesting transportation matching services. For example, requestor app 860 may include a transportation matching application for requestors. In some examples, requestor app 860 may match the user of requestor app 860 (e.g., a transportation requestor) with transportation providers through communication with dynamic transportation matching system 810. In addition, and as is described in greater detail below, requestor app 860 may provide dynamic transportation management system 810 with information about a requestor (including, e.g., the current location of the requestor) to enable dynamic transportation management system 810 to provide dynamic transportation matching services for the requestor and one or more providers. In some examples, requestor app 860 may coordinate communications and/or a payment between a requestor and a provider. According to some embodiments, requestor app 860 may provide a map service, a navigation service, a traffic notification service, and/or a geolocation service.

Embodiments of the instant disclosure may include or be implemented in conjunction with a dynamic transportation matching system. A transportation matching system may arrange transportation on an on-demand and/or ad-hoc basis by, e.g., matching one or more transportation requestors with one or more transportation providers. For example, a transportation matching system may provide one or more transportation matching services for a networked transportation service, a ridesourcing service, a taxicab service, a car-booking service, an autonomous vehicle service, a personal mobility vehicle service, or some combination and/or derivative thereof. The transportation matching system may include and/or interface with any of a variety of subsystems that may implement, support, and/or improve a transportation matching service. For example, the transportation matching system may include a matching system (e.g., that matches requestors to ride opportunities and/or that arranges for requestors and/or providers to meet), a mapping system, a navigation system (e.g., to help a provider reach a requestor, to help a requestor reach a provider, and/or to help a provider reach a destination), a reputation system (e.g., to rate and/or gauge the trustworthiness of a requestor and/or a provider), a payment system, and/or an autonomous or semi-autonomous driving system. The transportation matching system may be implemented on various platforms, including a requestor-owned mobile device, a computing system installed in a vehicle, a requestor-owned mobile device, a server computer system, or any other hardware platform capable of providing transportation matching services to one or more requestors and/or providers. While various examples provided herein relate to transportation, embodiments of the instant disclosure may include or be implemented in conjunction with a dynamic matching system applied to one or more services instead of and/or in addition to transportation services. For example, embodiments described herein may be used to match service providers with service requestors for any service.

Figure 9:
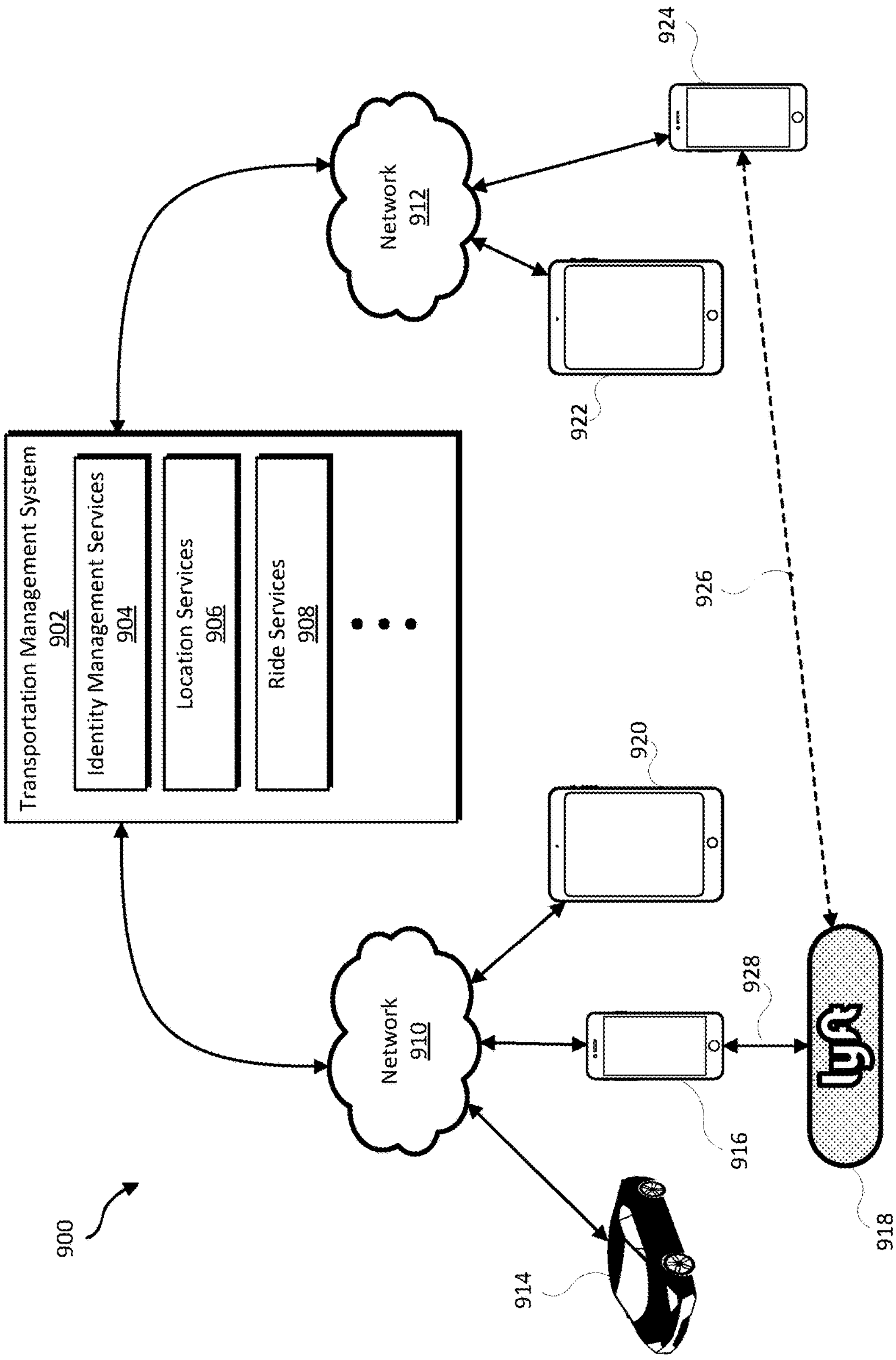
FIG. 9 is an illustration of an example transportation requestor/transportation provider management environment.

FIG. 9 shows a transportation management environment 900, in accordance with various embodiments. As shown in FIG. 9, a transportation management system 902 may run one or more services and/or software applications, including identity management services 904, location services 906, ride services 908, and/or other services. Although FIG. 9 shows a certain number of services provided by transportation management system 902, more or fewer services may be provided in various implementations. In addition, although FIG. 9 shows these services as being provided by transportation management system 902, all or a portion of any of the services may be processed in a distributed fashion. For example, computations associated with a service task may be performed by a combination of transportation management system 902 (including any number of servers, databases, etc.), one or more devices associated with a provider (e.g., devices integrated with managed vehicles 914(*a*), 914(*b*), and/or 914(*c*); provider computing devices 916 and tablets 920; and transportation management vehicle devices 918), and/or more or more devices associated with a ride requestor (e.g., the requestor's computing devices 924 and tablets 922). In some embodiments, transportation management system 902 may include one or more general purpose computers, server computers, clustered computing systems, cloud-based computing systems, and/or any other computing systems or arrangements of computing systems. Transportation management system 902 may be configured to run any or all of the services and/or software components described herein. In some embodiments, the transportation management system 902 may include an appropriate operating system and/or various server applications, such as web servers capable of handling hypertext transport protocol (HTTP) requests, file transfer protocol (FTP) servers, database servers, etc.

In some embodiments, identity management services 904 may be configured to perform authorization services for requestors and providers and/or manage their interactions and/or data with transportation management system 902. This may include, e.g., authenticating the identity of providers and determining that they are authorized to provide services through transportation management system 902. Similarly, requestors' identities may be authenticated to determine whether they are authorized to receive the requested services through transportation management system 902. Identity management services 904 may also manage and/or control access to provider and/or requestor data maintained by transportation management system 902, such as driving and/or ride histories, vehicle data, personal data, preferences, usage patterns as a ride provider and/or as a ride requestor, profile pictures, linked third-party accounts (e.g., credentials for music and/or entertainment services, social-networking systems, calendar systems, task-management systems, etc.) and any other associated information. Transportation management system 902 may also manage and/or control access to provider and/or requestor data stored with and/or obtained from third-party systems. For example, a requester or provider may grant transportation management system 902 access to a third-party email, calendar, or task management system (e.g., via the user's credentials). As another example, a requestor or provider may grant, through a mobile device (e.g., 916, 920, 922, or 924), a transportation application associated with transportation management system 902 access to data provided by other applications installed on the mobile device. In some examples, such data may be processed on the client and/or uploaded to transportation management system 902 for processing.

In some embodiments, transportation management system 902 may provide ride services 908, which may include ride matching and/or management services to connect a requestor to a provider. For example, after identity management services module 904 has authenticated the identity a ride requestor, ride services module 908 may attempt to match the requestor with one or more ride providers. In some embodiments, ride services module 908 may identify an appropriate provider using location data obtained from location services module 906. Ride services module 908 may use the location data to identify providers who are geographically close to the requestor (e.g., within a certain threshold distance or travel time) and/or who are otherwise a good match with the requestor. Ride services module 908 may implement matching algorithms that score providers based on, e.g., preferences of providers and requestors; vehicle features, amenities, condition, and/or status; providers' preferred general travel direction and/or route, range of travel, and/or availability; requestors' origination and destination locations, time constraints, and/or vehicle feature needs; and any other pertinent information for matching requestors with providers. In some embodiments, ride services module 908 may use rule-based algorithms and/or machine-learning models for matching requestors and providers.

Transportation management system 902 may communicatively connect to various devices through networks 910 and/or 912. Networks 910 and 912 may include any combination of interconnected networks configured to send and/or receive data communications using various communication protocols and transmission technologies. In some embodiments, networks 910 and/or 912 may include local area networks (LANs), wide-area networks (WANs), and/or the Internet, and may support communication protocols such as transmission control protocol/Internet protocol (TCP/IP), Internet packet exchange (IPX), systems network architecture (SNA), and/or any other suitable network protocols. In some embodiments, data may be transmitted through networks 910 and/or 912 using a mobile network (such as a mobile telephone network, cellular network, satellite network, or other mobile network), a public switched telephone network (PSTN), wired communication protocols (e.g., Universal Serial Bus (USB), Controller Area Network (CAN)), and/or wireless communication protocols (e.g., wireless LAN (WLAN) technologies implementing the IEEE 802.12 family of standards, Bluetooth, Bluetooth Low Energy, Near Field Communication (NFC), Z-Wave, and ZigBee). In various embodiments, networks 910 and/or 912 may include any combination of networks described herein or any other type of network capable of facilitating communication across networks 910 and/or 912.

In some embodiments, transportation management vehicle device 918 may include a provider communication device configured to communicate with users, such as drivers, passengers, pedestrians, and/or other users. In some embodiments, transportation management vehicle device 918 may communicate directly with transportation management system 902 or through another provider computing device, such as provider computing device 916. In some embodiments, a requestor computing device (e.g., device 924) may communicate via a connection 926 directly with transportation management vehicle device 918 via a communication channel and/or connection, such as a peer-to-peer connection, Bluetooth connection, NFC connection, ad hoc wireless network, and/or any other communication channel or connection. Although FIG. 9 shows particular devices communicating with transportation management system 902 over networks 910 and 912, in various embodiments, transportation management system 902 may expose an interface, such as an application programming interface (API) or service provider interface (SPI) to enable various third parties which may serve as an intermediary between end users and transportation management system 902.

In some embodiments, devices within a vehicle may be interconnected. For example, any combination of the following may be communicatively connected: vehicle 914, provider computing device 916, provider tablet 920, transportation management vehicle device 918, requestor computing device 924, requestor tablet 922, and any other device (e.g., smart watch, smart tags, etc.). For example, transportation management vehicle device 918 may be communicatively connected to provider computing device 916 and/or requestor computing device 924. Transportation management vehicle device 918 may establish communicative connections, such as connections 926 and 928, to those devices via any suitable communication technology, including, e.g., WLAN technologies implementing the IEEE 802.12 family of standards, Bluetooth, Bluetooth Low Energy, NFC, Z-Wave, ZigBee, and any other suitable short-range wireless communication technology.

In some embodiments, users may utilize and interface with one or more services provided by the transportation management system 902 using applications executing on their respective computing devices (e.g., 916, 918, 920, and/or a computing device integrated within vehicle 914), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In some embodiments, vehicle 914 may include a vehicle-integrated computing device, such as a vehicle navigation system, or other computing device integrated with the vehicle itself, such as the management system of an autonomous vehicle. The computing device may run on any suitable operating systems, such as Android®, iOS®, macOS®, Windows®, Linux®, UNIX®, or UNIX®-based or Linux®-based operating systems, or other operating systems. The computing device may further be configured to send and receive data over the Internet, short message service (SMS), email, and various other messaging applications and/or communication protocols. In some embodiments, one or more software applications may be installed on the computing device of a provider or requestor, including an application associated with transportation management system 902. The transportation application may, for example, be distributed by an entity associated with the transportation management system via any distribution channel, such as an online source from which applications may be downloaded. Additional third-party applications unassociated with the transportation management system may also be installed on the computing device. In some embodiments, the transportation application may communicate or share data and resources with one or more of the installed third-party applications.

Figure 10:
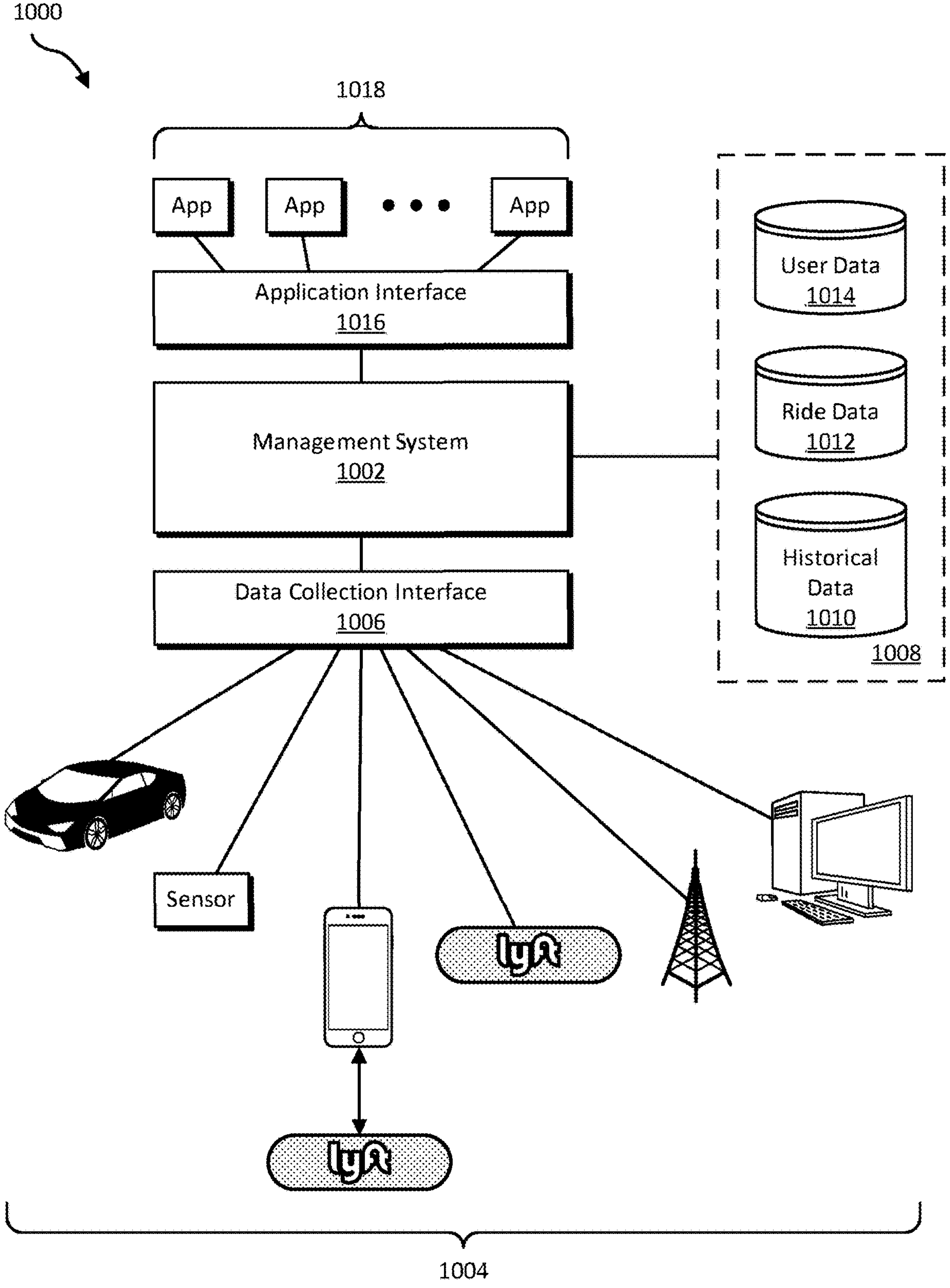
FIG. 10 is an illustration of an example data collection and application management system.

FIG. 10 shows a data collection and application management environment 1000, in accordance with various embodiments. As shown in FIG. 10, management system 1002 may be configured to collect data from various data collection devices 1004 through a data collection interface 1006. As discussed above, management system 1002 may include one or more computers and/or servers or any combination thereof. Data collection devices 1004 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 1006 can include, e.g., an extensible device framework configured to support interfaces for each data collection device. In various embodiments, data collection interface 1006 may be extended to support new data collection devices as they are released and/or to update existing interfaces to support changes to existing data collection devices. In various embodiments, data collection devices may communicate with data collection interface 1006 over one or more networks. The networks may include any network or communication protocol as would be recognized by one of ordinary skill in the art, including those networks discussed above. Data collection functionality may be disabled based on transportation provider and/or transportation requestor preferences. Collected data may be periodically erased (e.g., on an hourly basis or on a daily basis).

As shown in FIG. 10, data received from data collection devices 1004 can be stored in data store 1008. Data store 1008 may include one or more data stores, such as databases, object storage systems and services, cloud-based storage services, and other data stores. For example, various data stores may be implemented on a non-transitory storage medium accessible to management system 1002, such as historical data store 1010, ride data store 1012, and user data store 1014. Data stores 1008 can be local to management system 1002, or remote and accessible over a network, such as those networks discussed above or a storage-area network or other networked storage system. In various embodiments, historical data 1010 may include historical traffic data, weather data, request data, road condition data, or any other data for a given region or regions received from various data collection devices. Ride data 1012 may include route data, request data, timing data, and other ride related data, in aggregate and/or by requestor or provider. User data 1014 may include user account data, preferences, location history, and other user-specific data. Although certain data stores are shown by way of example, any data collected and/or stored according to the various embodiments described herein may be stored in data stores 1008.

As shown in FIG. 10, an application interface 1016 can be provided by management system 1002 to enable various apps 1018 to access data and/or services available through management system 1002. Apps 1018 may run on various user devices (including provider and requestor computing devices, such as those discussed above) and/or may include cloud-based or other distributed apps configured to run across various devices (e.g., computers, servers, or combinations thereof). Apps 1018 may include, e.g., aggregation and/or reporting apps which may utilize data 1008 to provide various services (e.g., third-party ride request and management apps). In various embodiments, application interface 1016 can include an API and/or SPI enabling third party development of apps 1018. In some embodiments, application interface 1016 may include a web interface, enabling web-based access to data 1008 and/or services provided by management system 1002. In various embodiments, apps 1018 may run on devices configured to communicate with application interface 1016 over one or more networks. The networks may include any network or communication protocol as would be recognized by one of ordinary skill in the art, including those networks discussed above, in accordance with an embodiment of the present disclosure.

While various embodiments of the present disclosure are described in terms of a networked transportation system in which the ride providers are human drivers operating their own vehicles, in other embodiments, the techniques described herein may also be used in environments in which ride requests are fulfilled using autonomous or semi-autonomous vehicles. For example, a transportation management system of a networked transportation service may facilitate the fulfillment of ride requests using both human drivers and autonomous vehicles. Additionally or alternatively, without limitation to transportation services, a matching system for any service may facilitate the fulfillment of requests using both human drivers and autonomous vehicles.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:

determining, using an electronic device operating in association with a vehicle in communication with a dynamic matching system, online data for the vehicle based on the electronic device indicating an online status associated with communicating with the dynamic matching system to accept transportation requests transmitted across one or more computer networks via requestor devices;

determining offline data for the vehicle based on the electronic device indicating an offline status associated with a lack of communication with the dynamic matching system to accept transportation requests transmitted across one or more computer networks via requestor devices;

determining an offline travel distance and an online travel distance associated with the vehicle within a time period based on the online data, the offline data, and telemetry information corresponding to a total distance traveled by the vehicle;

comparing the offline travel distance within the time period to a threshold to generate an offline travel distance exceeding the threshold; and providing, for display via a provider application of a provider computing device associated with the vehicle, the offline travel distance and the offline travel distance exceeding the threshold.

2. The computer-implemented method of claim 1, further comprising providing, for display via the provider application of the provider computing device, the online travel distance associated with the vehicle within the time period.

3. The computer-implemented method of claim 1, further comprising providing, for display via the provider application of the provider computing device, a display chart depicting the offline travel distance during the time period or the offline travel distance exceeding the threshold.

4. The computer-implemented method of claim 1, wherein generating the offline travel distance exceeding the threshold comprises determining a portion of the offline travel distance that exceeds the threshold.

5. The computer-implemented method of claim 1, further comprising determining a value associated with the offline travel distance exceeding the threshold.

6. The computer-implemented method of claim 1, further comprising, in response to receiving an entry executed on the provider application, causing the provider application to transition from an offline status to an online status.

7. The computer-implemented method of claim 1, further comprising determining a value associated with a portion of the offline travel distance that is within the threshold.

8. A system comprising:

at least one processor; and a non-transitory computer readable storage medium comprising instructions that, when executed by the at least one processor, cause the system to:

determine, using an electronic device operating in association with a vehicle in communication with a dynamic matching system, online data for the vehicle based on the electronic device indicating an online status associated with communicating with the dynamic matching system to accept transportation requests transmitted across one or more computer networks via requestor devices;

determine offline data for the vehicle based on the electronic device indicating an offline status associated with a lack of communication with the dynamic matching system to accept transportation requests transmitted across one or more computer networks via requestor devices;

determine an offline travel distance and an online travel distance associated with the vehicle within a time period based on the online data, the offline data, and telemetry information corresponding to a total distance traveled by the vehicle;

compare the offline travel distance within the time period to a threshold to generate an offline travel distance exceeding the threshold excess offline travel metrie; and provide, for display via a provider application of a provider computing device associated with the vehicle, the offline travel distance and the offline travel distance exceeding the threshold.

9. The system of claim 8, further comprising instructions that, when executed by the at least one processor, cause the system to provide, for display via the provider application of the provider computing device, the online travel distance associated with the vehicle within the time period.

10. The system of claim 8, further comprising instructions that, when executed by the at least one processor, cause the system to provide, for display via the provider application of the provider computing device, a display chart depicting the offline travel distance during the time period or the offline travel distance exceeding the threshold.

11. The system of claim 8, further comprising instructions that, when executed by the at least one processor, cause the system to generate the offline travel distance exceeding the threshold by determining a portion of the offline travel distance that exceeds the threshold.

12. The system of claim 8, further comprising instructions that, when executed by the at least one processor, cause the system to determine a value associated with the offline travel distance exceeding the threshold.

13. The system of claim 8, further comprising instructions that, when executed by the at least one processor, cause the system to, in response to receiving an entry executed on the provider application, cause the provider application to transition from an offline status to an online status.

14. The system of claim 8, further comprising instructions that, when executed by the at least one processor, cause the system to determine a value associated with a portion of the offline travel distance that is within the threshold.

15. A non-transitory computer-readable medium comprising instructions that, when executed by at least one processor of a server device, cause the server device to:

determine, using an electronic device operating in association with a vehicle in communication with a dynamic matching system, online data for the vehicle based on the electronic device indicating an online status associated with communicating with the dynamic matching system to accept transportation requests transmitted across one or more computer networks via requestor devices;

determine offline data for the vehicle based on the electronic device indicating an offline status associated with a lack of communication with the dynamic matching system to accept transportation requests transmitted across one or more computer networks via requestor devices;

determine an offline travel distance and an online travel distance associated with the vehicle within a time period based on the online data, the offline data, and telemetry information corresponding to a total distance traveled by the vehicle;

compare the offline travel distance within the time period to a threshold to generate an offline travel distance exceeding the threshold; and provide, for display via a provider application of a provider computing device associated with the vehicle, the offline travel distance and the offline travel distance exceeding the threshold.

16. The non-transitory computer-readable medium of claim 15, further comprising instructions that, when executed by the at least one processor, cause the server device to provide, for display via the provider application of the provider computing device, the online travel distance associated with the vehicle within the time period.

17. The non-transitory computer-readable medium of claim 15, further comprising instructions that, when executed by the at least one processor, cause the server device to provide, for display via the provider application of the provider computing device, a display chart depicting the offline travel distance during the time period or the offline travel distance exceeding the threshold.

18. The non-transitory computer-readable medium of claim 15, further comprising instructions that, when executed by the at least one processor, cause the server device to generate the offline distance exceeding the threshold by determining a portion of the offline travel distance that exceeds the threshold.

19. The non-transitory computer-readable medium of claim 15, further comprising instructions that, when executed by the at least one processor, cause the server device to determine a value associated with the offline travel distance exceeding the threshold.

20. The non-transitory computer-readable medium of claim 15, further comprising instructions that, when executed by the at least one processor, cause the server device to in response to receiving an entry executed on the provider application, cause the provider application to transition from an offline status to an online status.

* * * * *